United States Patent [19]

Shinnosuke

[11] Patent Number: 5,233,527
[45] Date of Patent: Aug. 3, 1993

[54] AUTOMATIC TRAVELLING APPARATUS

[75] Inventor: Ishida Shinnosuke, Saitama, Japan

[73] Assignee: Honda Giken Kogyo Kabushiki Kaisha, Tokyo, Japan

[21] Appl. No.: 671,398

[22] Filed: Mar. 19, 1991

[30] Foreign Application Priority Data

Mar. 19, 1990 [JP] Japan .................... 2-69005

[51] Int. Cl.⁵ .............................. G06F 15/50
[52] U.S. Cl. ................ 364/424.02; 180/169; 358/103
[58] Field of Search ........... 364/424.02; 395/94; 180/167–169; 358/103

[56] References Cited

U.S. PATENT DOCUMENTS

| | | | |
|---|---|---|---|
| 4,819,169 | 4/1989 | Saitoh et al. | 364/424.02 |
| 4,905,151 | 2/1990 | Weiman et al. | 364/424.02 |
| 4,926,346 | 5/1990 | Yokoyama | 364/424.02 |
| 4,954,962 | 9/1990 | Evans, Jr. et al. | 180/169 X |
| 4,970,653 | 11/1990 | Kenue | 364/461 |
| 5,101,351 | 3/1992 | Hattori | 364/424.02 |

*Primary Examiner*—Thomas G. Black
*Attorney, Agent, or Firm*—Lyon & Lyon

[57] ABSTRACT

An automatic travelling apparatus which is capable of finding a permissible travelling area ahead of a running vehicle by use of an image pick-up device attached to the vehicle, setting a target course in the determined permissible travelling area, estimating steering amount for permitting the vehicle to follow the target course and steering the vehicle with reference to the target steering amount, and also provides the possibility of estimating the maximum permissible steering angle at the present running speed from the characteristic data such as the maximum permissible lateral load and maximum permissible yaw rate etc., and limiting the target steering amount not to exceed the maximum steering amount.

4 Claims, 6 Drawing Sheets

AUTOMATIC TRAVELLING APPARATUS

BACKGROUND OF THE INVENTION

The present invention relates to an automatic travelling apparatus capable of finding out a permissible travelling area for the purpose of permitting a vehicle to automatically run along a road.

Recently, there has been developed such an automatic travelling apparatus which is capable of finding out a permissible travelling area, setting a target course thereon and steering a vehicle to run along the target course.

The automatic travelling apparatus disclosed in the Japanese laid open patent publication No. 199610-88 is intended to continuously take an image of an area ahead of a vehicle in its running direction by an image pick-up device attached to the vehicle; make data processing of the taken image for extracting therefrom continuous line segments such as road edges; determine a permissible travelling area ahead of the vehicle on the basis of the extracted continuous line segments; set a target course in the determined permissible travelling area; estimate a steering amount necessary for following the target course on the basis of the currently detected running condition of the vehicle; and steer the vehicle to follow the target course with reference to the steering amount.

The above-mentioned automatic travelling apparatus is required to stably steer the vehicle by limiting the target steering amount below the maximum permissible steering angle in consideration of the running speed.

SUMMARY OF THE INVENTION

In view of the foregoing, the present invention was made to provide an automatic travelling apparatus which is capable of estimating the maximum permissible steering angle from the vehicle characteristics such as maximum steering angle and maximum permissible yaw rate in accordance with the current running speed and limiting the target steering amount below the maximum steering angle while conducting steering control of the vehicle according to the target steering amount for permitting the vehicle to follow the target course set in the permissible travelling area.

DESCRIPTION OF THE PREFERRED EMBODIMENTS

Referring now to the drawings, a preferred embodiment of the present invention will be described in detail as follows:

In the drawings, 1 is an image pick-up device, 2 is an image processor, 3 is a means for determining a permissible travelling area, 4 is a means for setting a target course, 5 is a control means, 6 is a running speed sensor, 7 is a Yaw rate sensor, 8 is a steering angle sensor, 9 a steering controller, 10 a steering drive, 11 is a vehicle. Characters RA denote a permissible travelling area, characters OC denote target courses and character P denotes a position of a vehicle.

Figures 1, 2, 3:
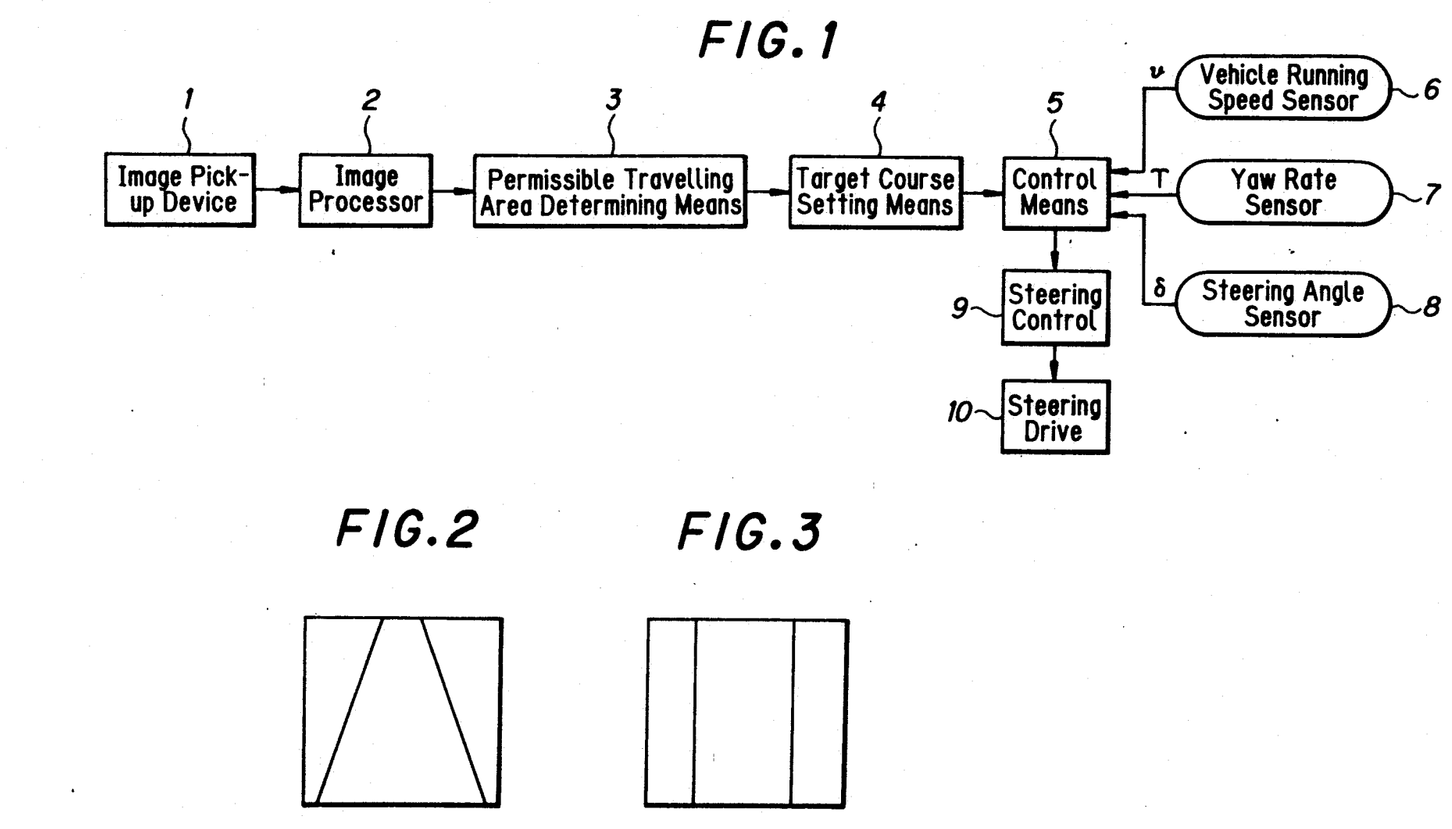
FIG. 1 is a block diagram showing a structure of an automatic travelling apparatus embodying the present invention.
FIG. 2 shows line segments of a road edges obtained by data processing of an image taken by a video camera.
FIG. 3 shows an image obtained by projective transformation of the image shown in FIG. 2.

In FIG. 1, an automatic travelling apparatus according to the present invention comprises: an image pick-up device 1 such as a video camera attached to a vehicle for continuously picking up subsequent images of an area ahead of the vehicle; means 2 for processing the images taken by the image pick-up device 1 to extract therefrom segments of continuous lines such as road edges and the like; means 3 for determining, on the basis of the obtained continuous line segments, a permissible travelling area such as a road in the direction in which the vehicle is to travel; means 4 for setting a target course in the permissible travelling area thus determined; means 5 for determining the instantaneous running condition of the vehicle on the basis of an output signal from a speed sensor 6 representing the vehicle's running speed "v", an output signal from a yaw rate sensor 7 representing the yaw rate "Y" and an output signal from a steering angle sensor 8 representing the tire angle "δ" which varies with the steering of the vehicle, and for estimating, on the basis of the instantaneous running condition, a steering amount to permit the vehicle to follow the target course, and for limiting the steering amount below the maximum permissible steering angle; and means 9 (and a steering drive 10) for steering the vehicle with reference to the steering amount.

Actually, a microcomputer aided control is used in place of means 2, 3, 4 and 5, and means 9 can be included in the microcomputer aided control, if occasions demand.

The extraction of continuous line segments such as road edges from the taken image in the image processing means 2 can be made as follows:

First, each image supplied from the image pick-up device 1 is subjected to differentiation process for detection of the road edges. Then, an automatic threshold setting circuit in the image processing means 2 sets an optimum threshold value in consideration of the degree of shade of the road edge image information just processed. The road edge image will be subjected to binary transformation.

Alternately, first, the images may be subjected to binary transformation, and then the binary data may be subjected to differentiation. In place of binary transformation poly-digitization may be performed to express some shade details of image.

Digitized image information will be subjected to the Hough conversion to convert X-Y linear coordinates to the corresponding $\rho$-$\theta$ point coordinates, thus eliminating isolated points and plotting to provide a continuous line segments of the road edges as shown in FIG. 2.

Figure 10:
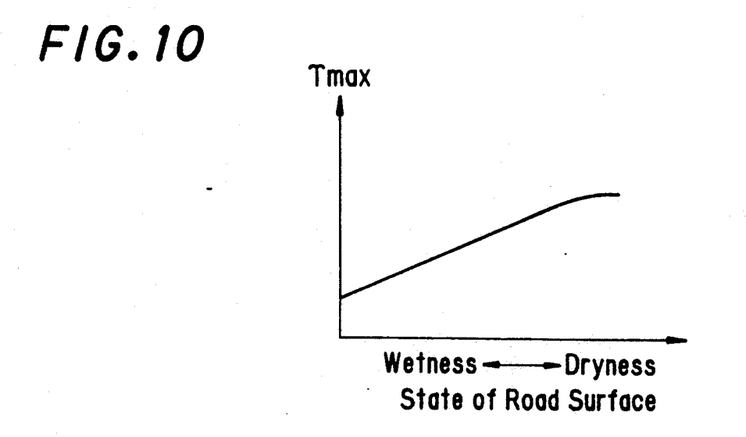
FIG. 10 shows a characteristic curve of maximum permissible yaw rate of a vehicle depending on degree of wetness or dryness of ground surface.

$\theta$ stands for an angle formed between the X-axis and a perpendicular from the origin of the X-Y coordinates to a line segment, whereas $\rho$ stands for the length of the normal line. For instance, the line L in the X-Y coordinates in FIG. 10 is expressed as the point 01 in the $\rho$-$\theta$ point coordinates in FIG. 11.

On that occasion, edge tracing may be performed on the basis of binary-coded image information to obtain a continuous road edge. The Hough conversion, edge tracing and other appropriate processings may be performed simultaneously, and then synthetic judgement may be made on the results of these processings to obtain a precise road edge information. More accurate road edge information may be taken out when the above-mentioned image processings are made with progressively developing an input image area as the vehicle travels.

The image taken by a video camera represents a perspective view. The perspective road edge image as shown in FIG. 2 can be converted into a non-perspective road edge image as shown in FIG. 3 according to the known projective conversion process.

The permissible travelling area determining means 3 has a projective conversion characteristics set in consideration of the perspective characteristics of associated video cameras.

Figure 4:
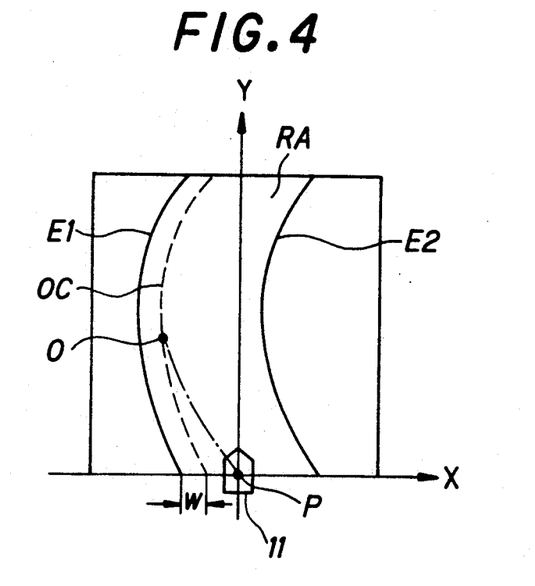
FIG. 4 shows an example of a target course set in a permissible travelling area between detected road edges.

The permissible travelling area determining means 3 can determine, on the basis of the non-perspective road image obtained by projective conversion, for instance, an area between the continuous road edges E1 and E2 shown in FIG. 4 as a permissible travelling area RA in the X-Y coordinates wherein the Y-axis corresponds to the direction in which the image is taken by the image pick-up device 1, i.e., the vehicle 11 is to travel.

In FIG. 4, a instantaneous position of the vehicle 11 is indicated at a point "P", and the video camera of the image pick-up device 1 is mounted at a predetermined position on the vehicle whereat the point "P" may appear at the center lower point of the display screen as the origin of the X-Y coordinates.

After a permissible travelling area is determined by the permissible travelling area determining means 3, the target course setting means 4 will select a course most appropriate for running in the permissible travelling area, and will set the so selected course as a target course to follow.

Preferably, the course may be determined in consideration of the road contour and the running speed of the vehicle to meet the instantaneous travelling condition of the vehicle. However, the course may be basically determined in the width of the road as follows:

In case that the target course setting means 4 finds that the width of the road is above a predetermined extent, and that vehicles must keep to the left, a target course OC will be set a given constant distance "w" (for instance, 1.5 meters) apart from the left edge of the road, as shown in FIG. 4.

In case that the width of the road is below the predetermined extent, a target course will be set along the center line (not shown) of the road.

The coordinates of the target course are stored in the memories of the target course setting means 4 and are continuously renewed as the vehicle is running. The divisions of the X-Y coordinates for the permissible travelling area and the target course are selected in compliance with the magnification of the video camera of the image pick-up device 1.

In FIG. 4, the trace of the vehicle from "P" to "0" represents the course actually followed by the vehicle under the control of the control means 5 until the vehicle has come to the target course OC at the point 0.

According to the present invention, it is also possible to set a target course in consideration of the running condition of the vehicle as follows:

In case that the target course setting means 4 finds that the running speed measured by the speed sensor 6 is below a predetermined speed, the target course OC will be set in conformity with the road contour as seen from FIG. 4.

Figure 5A:
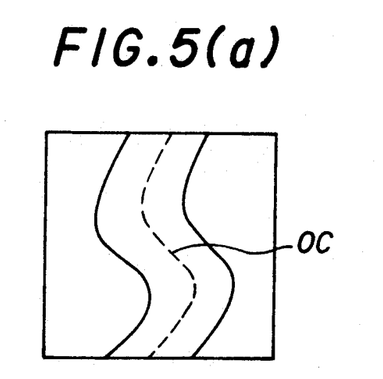
FIGS. 5(a) and 5(b) show target courses set on a road which a vehicle is to travel at a low speed (a) and a high speed (b) respectively.
Figure 5B:
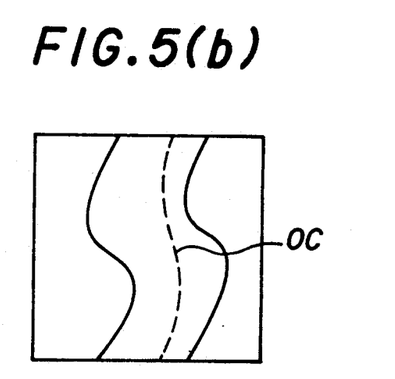

When the running speed of the vehicle is higher than a predetermined speed, and when the vehicle is running a curved road as shown in FIG. 5(b), a target course OC of reduced curvature is set so as to reduce the lateral force which is applied to the vehicle.

After setting a target course in the road, the control means 5 will estimate a steering amount to permit the vehicle to follow the target course as follows:

When the steering amount relates to a steering angle of the vehicle, the control means 5 presumes, on the basis of the currently detected running condition, a course which the vehicle will run along; calculates a deviation of the presumed running course from the target course; determines a correction value of steering angle for bringing the vehicle to follow the target course and estimate therefrom a target steering amount.

Practically, for example, the position where the vehicle will attain is presumed as a point located apart from the X-axis by a specified distance in the X-Y coordinates having the Y-axis representing the running direction of the vehicle and the lateral deviation of the presumed point from the target point set on the target course is measured to finally determine thereby a corresponding correction value of the steering angle.

Now it is assumed that a vehicle 11 at Point "P" is controlled to get on the target course OC.

First, the distance L (m) (L=v x T) on the Y-axis which the vehicle can run in T seconds will be determined on the basis of the vehicle's running speed v (m/s) which is determined by the speed sensor 6. Then, the lateral deviation xl from Point C (on which the vehicle would be in T seconds if it travelled straight along the Y-axis by the distance L) to the target course OC will be estimated.

Second, the course AC which the vehicle is supposed to follow will be estimated from the yaw rate T (rad/sec) detected by the yaw rate sensor 7, and then the lateral deviation xm of the presumed course AC from the Point C will be estimated by the following equation:

$$xm = R - \{R^2 - (v \times tm)^2\}^{\frac{1}{2}}$$
$$= R - R\{1 - (v \times tm/R)^2\}^{\frac{1}{2}}$$

where R stands for a radius of the presumed course AC. When $R >> v \times tm$, we obtain $$xm \approx R - R\{1 - (v \times tm/R)^2/2\} \quad (1)$$
$$= v^2 \times tm^2/2R$$
$$= L^2/2R$$

$$T = v/R \quad (2)$$

From Equations (1) and (2)

$$xm = L^2 \cdot Y/2v \quad (3)$$

The positive sign of yaw rate Y represents that the presumed course AC turns to the left whereas the negative sign indicates the presumed course turning to the right.

The yaw rate $\Delta Y$ to which the yaw rate of the vehicle is to be corrected will be determined from the following equation:

$$\Delta Y = eX2v/L^2 \quad (4)$$

Figure 7:
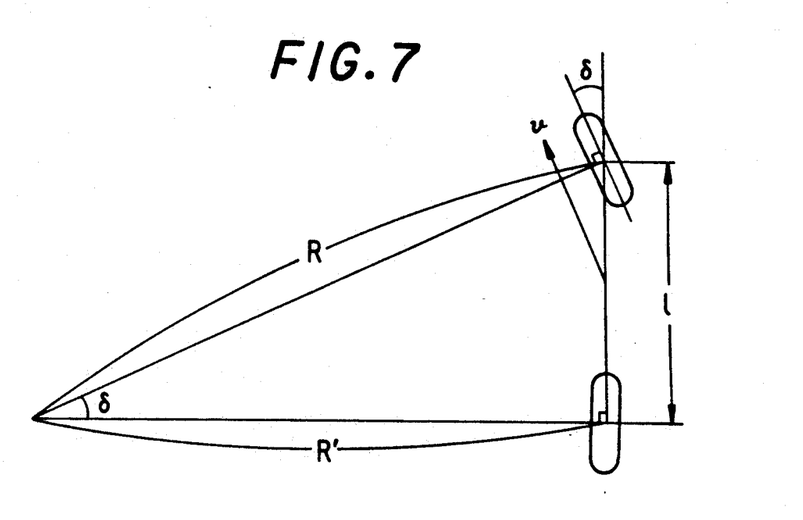
FIG. 7 shows a relationship between a vehicle's steering angle and its turning radius.

Then, on the basis of the tire angle $\delta$ detected at Point P by the steering angle sensor 8, the steering amount $\delta'$ for permitting the vehicle to get on the target course OC can be determined as follows:

Referring to FIG. 7, when $R >> 1$, the following equation can be obtained:

$$\delta \approx 1/R \quad (5)$$

From equations (2) and (5) we can derive $$\delta = (l/v)Y \quad (6)$$

where l stands for a wheelbase. According to the equation (6) the tire angle $\Delta\delta$ for correction in accordance with the yaw rate $\Delta Y$ to be corrected can be given by the following equation:

$$\Delta\delta = (l/v)\Delta Y \quad (7)$$

In consideration of an usual equation of steering angle in relation to the running speed, i.e., substituting $l = (1 + Kv^2)$ into the equation (7), we can obtain $$\Delta\delta = \Delta Y\{l(1 + Kv^2)/v\} \quad (8)$$

where "K" is a constant which is determined both from the tire characteristics and the vehicle characteristics such as wheel base and so on.

Therefore, a steering amount $\delta'$ for permitting the vehicle to get on the target course can be obtained by the following equation:

$$\delta' = \delta + \Delta\delta \quad (9)$$

In response to the steering amount $\delta'$ given from the control means 5 the steering control means 9 issues a drive command to the steering drive 10 which in turn steers the vehicle toward the target course OC.

Figure 6:
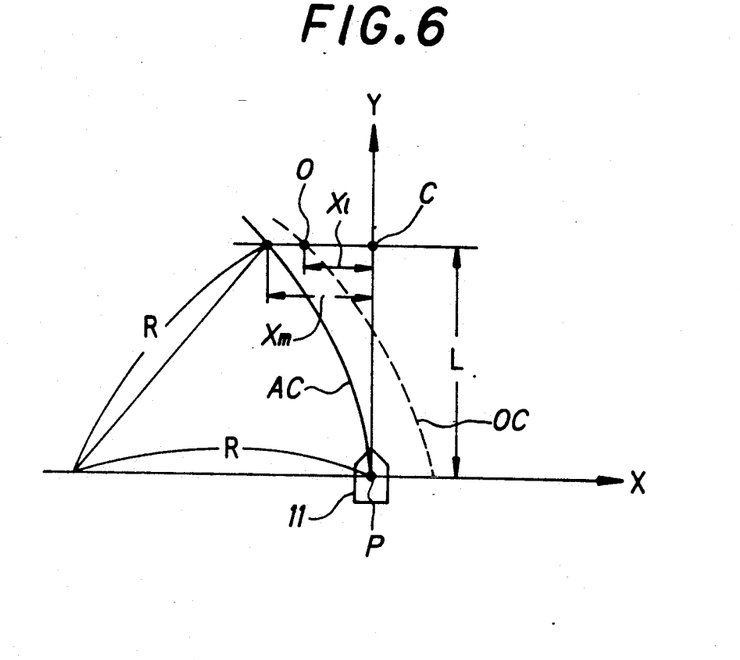
FIG. 6 shows a relationship between a target course and a presumed course.

Referring to FIG. 6, when the distance L on the Y-axis (the perpendicular distance L from the X-axis to the target point on the target course) is set, it may be treated as a variable depending on the vehicle running speed v detectable by the running speed sensor 6. Namely, when vehicle running at a lower speed, the distance L may be set to shorter one for the purpose of permitting the vehicle to travel the reduced distance from Point P and thereby to fast attain the target course OC. On the contrary, when vehicle running at a higher speed, the distance L may set to longer one for the purpose of permitting the vehicle to travel the increased distance from Point P and thereby to gently get on the target course OC.

In case of going along a curved road it is also possible to select the shorter distance L at the smaller radius of curvature of the road for the purpose of permitting the vehicle to fast attain the target course.

In order to achieve smooth approach of the vehicle to the target course it is also possible to determine the travelling course from Point P to Point O for permitting the vehicle to get on the target course OC by the approximate analysis with use of a curve pattern model on the basis of the course curvature calculated by the control means in consideration of the distance L and the running speed v.

For instance, a function "$y = x - \sin x$" or a function "$y = x^3$" may be used as the model of the travelling course curve.

Figure 8:
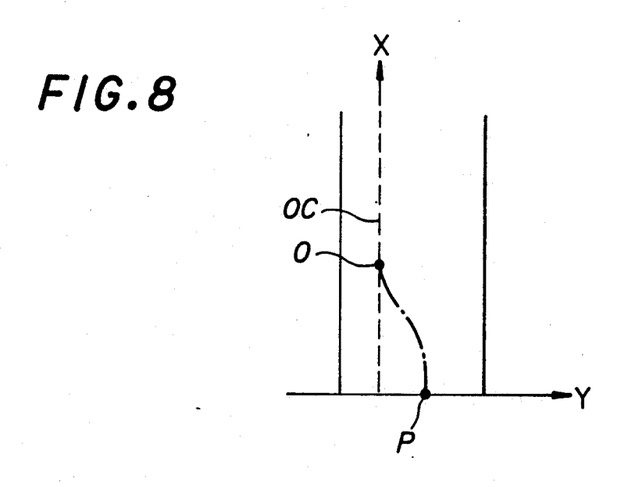
FIG. 8 shows an example of a travelling course which a vehicle takes to attain a target course.

FIG. 8 shows a travelling course pattern determined by using the travelling course curve model of the function $y = x - \sin x$.

The above-mentioned processing operations will be repeated at an interval of a specified control cycle including the time required for operations, thereby the steering control of the vehicle may be continuously performed to permit the vehicle to follow the target course OC set in the permissible travelling area which is successively renewable at every control cycle.

The automatic travelling apparatus according to the present invention further includes means for determining the maximum permissible steering angle from the vehicle characteristics such as maximum lateral load, maximum yaw rate and so on, and means for limiting the target steering amount below the maximum permissible steering angle.

Operations of the above-mentioned means are as follows:

First, the control means 5 determines, on the basis of a vehicle running speed detected by the speed sensor 6 and a value of maximum lateral load G max stored in the vehicle characteristics file of its memory, the maximum permissible steering angle $\delta$ max of a vehicle when turning at the detected running speed v and at a radius R of curvature by the following operation expression:

Generally, the lateral load G applied to the vehicle turning at running speed v and radius R of curvature is given by the following equation:

$$G = Y \cdot v \quad (10)$$

where $T = v/R$.

From Equation (6) we can obtain:

$$Y = \delta \cdot v/l \quad (11)$$

Accordingly, from the relationship between Equations (10) and (11) in consideration of the general expression $l = l (1 + Kv^2)$ for calculation of steering angle vs. running speed of a vehicle the following equation is obtained for determining the maximum permissible steering angle $\delta$ max:

$$\delta\ max = G\ max \cdot l(1+Kv^2)/v^2 \qquad (12)$$

It is also possible to previously store the maximum permissible yaw rate Y max in the vehicle characteristics file of the memory of control means 5 and to calculate, on the basis of the maximum permissible yaw rate Y max, the maximum permissible steering angle δ max of the vehicle when turning at its running speed v and at radius R of curvature as follows:

Since Equation (10) can allow $$G\ max = Y\ max \cdot v \qquad (13),$$

Equations (12)(13) give the following equation for determining the maximum permissible steering angel δ max:

$$\delta\ max = Y\ max \cdot l(1+Kv^2)/v \qquad (14)$$

Figure 9:
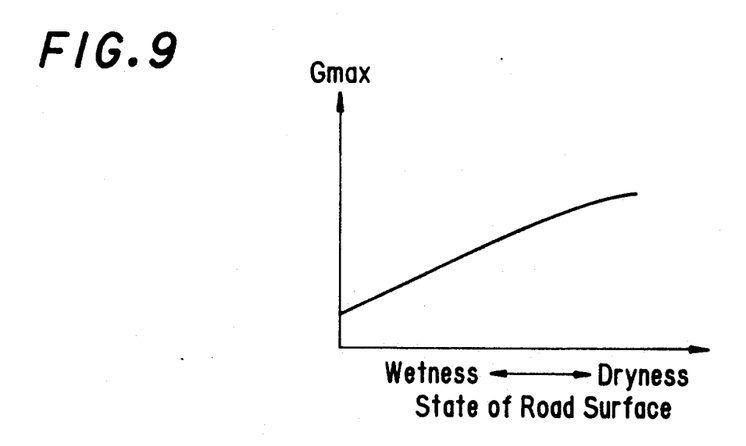
FIG. 9 shows a characteristic curve of maximum permissible lateral load of a vehicle depending on degree of wetness or dryness of ground surface.

Both the maximum permissible lateral load G max and the maximum yaw rate Y max can vary depending on how much the road is wetted or dried as shown in FIG. 9 (for G max) and FIG. 10 (for Y max).

Therefore, the values of G max and Y max previously determined at every degrees of wetness and dryness of the road surface according to the characteristic curves of FIGS. 9 and 10 are stored in the memory of the control means and, when the degree of wetness or dryness of the road surface is detected, the corresponding value of the maximum permissible lateral load G max or yaw rate Y max will be read out.

Practically, the wetness or dryness of the road surface may be detected by brightness of the image of the permissible travelling area taken by the video camera.

The control means 5 can also limit the target control value of steering angle δ' not to exceed the maximum permissible steering angle δ max when steering the vehicle to follow the target course OC.

Consequently, there may be no possibility of steering the vehicle to follow the target course OC at the steering amount δ' exceeding the maximum permissible steering angle δ max.

In case if the target steering angle δ' may exceed the maximum permissible steering angle δ max due to the running speed v, the limiting operation is performed as follows:

Namely, in this case the control means 5 increases the distance L from the present position P to the target course OC by the predeterminate extent in accordance with the excess value of the steering angle δ' over the maximum permissible steering angle δ max, then estimates a new target value of steering angle δ' not exceeding the maximum permissible value δ max, and then conducts the steering control with the newly determined steering amount for permitting the vehicle to follow the target course OC.

Figure 14:
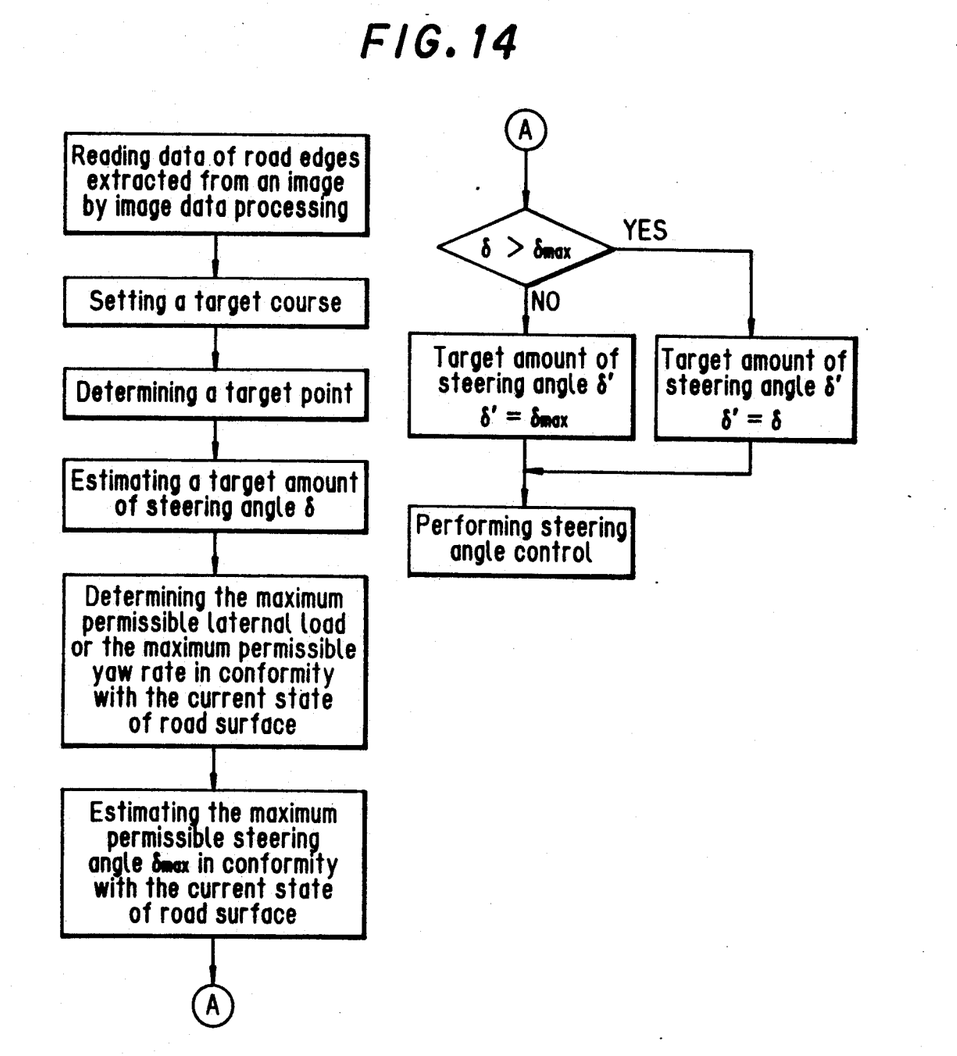
FIG. 14 shows an example of a flow of control according to the present invention.

FIG. 14 shows a flow of control according to the present invention.

According to the present invention, it is possible to assure steady steering control for permitting the vehicle to follow the target course at the steering angle δ' not exceeding the maximum permissible steering angle δ max at the actual running speed v.

Figure 11A:
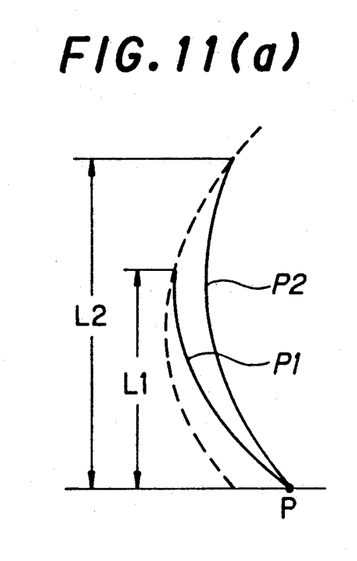
FIG. 11(a) and (b) show examples of travelling courses which a vehicle takes to attain a target course.
Figure 11B:
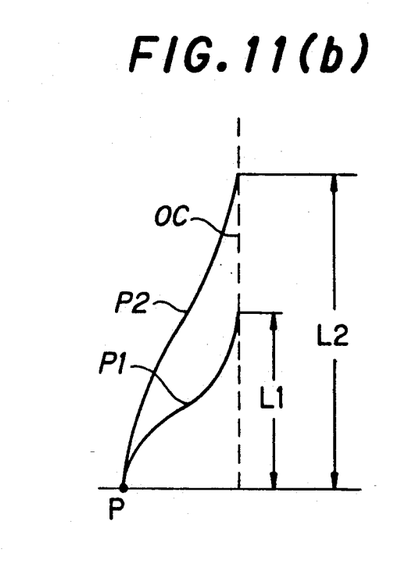
Figure 12:
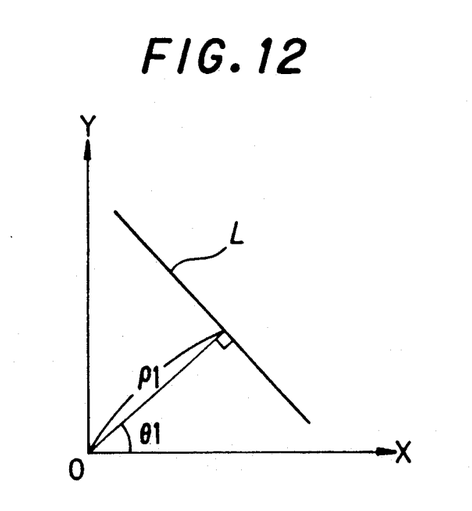
FIG. 12 shows a line segment in the X-Y coordinates.
Figure 13:
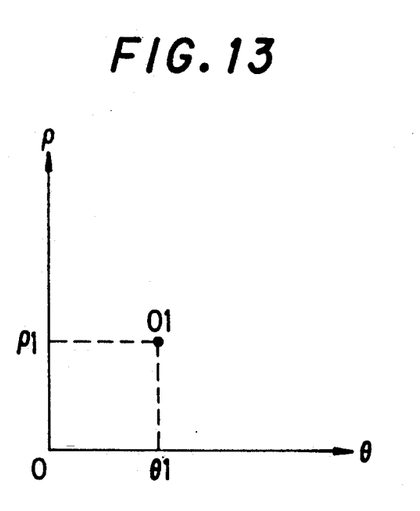
FIG. 13 shows a point in the $\rho$-$\theta$ point coordinates obtained by the Hough conversion of the line segment shown in FIG. 10.

FIGS. 11 (a) and (b) show the relationship between the travelling courses P1 and P2 which the vehicle takes to get on the target course OC at the steering angle δ' exceeding the maximum permissible steering angle δ max and at the steering angle δ' not exceeding the maximum permissible steering angle δ max respectively. In FIGS. 11 (a) and (b), L1 is an initial set value of the distance L whereat the steering angle δ' exceeds the maximum permissible steering angle δ max, and L2 is a subsequently set value of the distance L, which is selected in accordance with the excess value of steering angle δ' over the maximum permissible steering angle δ max.

As be apparent from the foregoing description, the automatic travelling apparatus according to the present invention, which is capable of finding a permissible travelling area ahead of a running vehicle by use of an image pick-up device attached to the vehicle, setting a target course in the determined permissible travelling area, estimating steering amount for permitting the vehicle to follow the target course and steering the vehicle with reference to the target steering amount, offers such an advantage that by limiting the target steering amount below the maximum permissible steering angle it can realize steady steering control of the vehicle to follow the target course in conformity with actual running condition.

What is claimed is:

1. An automatic travelling apparatus comprising:
   means for picking-up an image of an area ahead of a running vehicle by an image pick-up device attached to the vehicle;
   means for extracting continuous lines segments by processing data sampled from the taken image;
   means for determining a permissible travel area ahead of the vehicle on the basis of the continuous line segments extracted;
   means for setting a target course in the permissible travelling area thus determined;
   means for detecting an instantaneous running condition of the vehicle;
   means for determining a maximum permissible steering angle based on the instantaneous running condition of the vehicle;
   means for estimating, on the basis of the instantaneous running condition, a target steering amount to permit the vehicle to follow the target course, said target steering amount being limited such that it does not exceed said maximum permissible steering angle; and
   means for steering the vehicle with reference to the steering amount.

2. An automatic travelling appartus as claimed in claim 1, wherein said maximum steering angle is determined based on a maximum permissible lateral load.

3. An automatic travelling apparatus as claimed in claim 1, wherein said maximum steering angle is determined based on a maximum permissible yaw rate.

4. An automatic travelling apparatus comprising:
   means for picking-up an image of an area ahead of a running vehicle by an image pick-up device attached to the vehicle;
   means for extracting continuous lines segments by processing data sampled from the taken image;
   means for determining a permissible travel area ahead of the vehicle on the basis of the continuous line segments extracted;
   means for setting a target course in the permissible travelling area thus determined;
   means for detecting an instantaneous running condition of the vehicle, said instantaneous running condition being a function of a speed of travel of the vehicle, a maximum lateral load of the vehicle, and an amount of moisture on a road on which the vehicle is travelling, said amount of moisture being determined based on an amount of brightness of said permissible travel area within said image of said area ahead of the running vehicle;

means for determining a maximum permissible steering angle based on the instantaneous running condition of the vehicle;

means for estimating, on the basis of the instantaneous running condition, a target steering amount to permit the vehicle to follow the target course, said target steering amount being limited such that it does not exceed said maximum permissible steering angle; and means for steering the vehicle with reference to the steering amount.

* * * * *

UNITED STATES PATENT AND TRADEMARK OFFICE
CERTIFICATE OF CORRECTION

PATENT NO. : 5,233,527
DATED :  August 3, 1993
INVENTOR(S) : S. Ishida

It is certified that error appears in the above-indentified patent and that said Letters Patent is hereby corrected as shown below:

On the title page:

ITEM: [75], correct the inventor's name to read -- Shinnosuke Ishida --.

Item [19], "Shinnosuke" should read --Ishida --.

Signed and Sealed this

Twenty-ninth Day of November, 1994

Attest:

BRUCE LEHMAN

Attesting Officer    *Commissioner of Patents and Trademarks*